(12) United States Patent
Richter et al.

(10) Patent No.: US 8,566,136 B2
(45) Date of Patent: Oct. 22, 2013

(54) METHOD FOR THE SECURE LOGGING OF CORRESPONDENCE AND NOTIFICATION THEREOF

(75) Inventors: Clayton Vaughn Richter, Aurora, OH (US); Nathan Walden, Burton, OH (US); Amanda Stevens, Twinsburg, OH (US)

(73) Assignee: Emergency Response and Training Solutions, Inc, Chagrin Falls, OH (US)

( * ) Notice: Subject to any disclaimer, the term of this patent is extended or adjusted under 35 U.S.C. 154(b) by 0 days.

(21) Appl. No.: 13/291,538

(22) Filed: Nov. 8, 2011

(65) Prior Publication Data

US 2012/0059763 A1    Mar. 8, 2012

Related U.S. Application Data

(63) Continuation of application No. 13/236,171, filed on Sep. 19, 2011, and a continuation-in-part of application No. 12/286,779, filed on Oct. 2, 2008.

(60) Provisional application No. 60/997,303, filed on Oct. 2, 2007.

(51) Int. Cl.
    *G06Q 10/00* (2012.01)
(52) U.S. Cl.
    USPC .................................................. 705/7.17
(58) Field of Classification Search
    USPC .................................................. 705/7.17
    See application file for complete search history.

(56) References Cited

U.S. PATENT DOCUMENTS

| | | | |
|---|---|---|---|
| 5,548,506 A * | 8/1996 | Srinivasan | 705/7.15 |
| 5,726,884 A * | 3/1998 | Sturgeon et al. | 705/7.12 |
| 5,897,635 A | 4/1999 | Torres et al. | |
| 6,064,990 A | 5/2000 | Goldsmith | |
| 6,941,305 B2 | 9/2005 | Magouirk et al. | |
| 7,257,200 B2 | 8/2007 | Valeriano et al. | |
| 2001/0000192 A1 | 4/2001 | Gonzalez et al. | |
| 2001/0027451 A1 | 10/2001 | Taguchi et al. | |
| 2002/0026328 A1 | 2/2002 | Westerkamp et al. | |
| 2002/0128891 A1 | 9/2002 | McSherry | |

(Continued)

OTHER PUBLICATIONS

Thomas et al, "EVResponse—Moving Beyond Traditional Emergency Response Notification,"America's Conference on Information Systems, Aug. 2005.*

(Continued)

*Primary Examiner* — David Rines
*Assistant Examiner* — Amanda Gurski
(74) *Attorney, Agent, or Firm* — Turocy & Watson, LLP (57) ABSTRACT

Systems and methods are disclosed that create a secure electronically recorded log utilizable in the field of emergency response material spill remediation. The system can receive information regarding a spill incident, wherein the information includes an approximate location of the spill incident or a description of a material spilt, populate the secure electronically recorded log with a geolocation code associated with the spill incident, wherein the geolocation code is ascertained as a function of the approximate location of the spill incident, and communicate a notification to a Project Manager assigned to oversee remediation of the spill incident or a representative of a client that supplied the information regarding the spill incident.

20 Claims, 6 Drawing Sheets

(56) References Cited

U.S. PATENT DOCUMENTS

| | | |
|---|---|---|
| 2003/0187715 A1 | 10/2003 | Foss |
| 2003/0216949 A1* | 11/2003 | Kram et al. ............... 705/5 |
| 2004/0015367 A1* | 1/2004 | Nicastro et al. ............ 705/1 |
| 2004/0073621 A1 | 4/2004 | Sampson |
| 2004/0230455 A1 | 11/2004 | McKinney et al. |
| 2005/0015427 A1 | 1/2005 | Guo et al. |
| 2006/0248043 A1 | 11/2006 | Powers |

OTHER PUBLICATIONS

U.S. Office Action for U.S. Appl. No. 12/286,779 mailed on Oct. 7, 2011.

Thomas et al, "EVResponse—Moving Beyond Traditional Emergency Response Notification," America's Conference on Information Systems, Aug. 2005.

Office Action dated Jan. 23, 2012 for PCT Application Serial No. 13236171, 35 pages.

Office Action dated May 29, 2012 for U.S. Appl. No. 12/286,779, 30 pages.

Office Action dated Jul. 3, 2012 for U.S. Appl. No. 13/236,171, 36 pages.

Advisory Action dated Sep. 13, 2012 for U.S. Appl. No. 12/286,779, 8 pages.

Office Action dated Nov. 14, 2012 for U.S. Appl. No. 12/286,779, 33 pages.

* cited by examiner

METHOD FOR THE SECURE LOGGING OF CORRESPONDENCE AND NOTIFICATION THEREOF

PRIORITY CLAIM

This application is a continuation of co-pending U.S. patent application Ser. No. 13/236,171, entitled "METHOD FOR THE SECURE LOGGING OF CORRESPONDENCE AND NOTIFICATION THEREOF", filed on Sep. 19, 2011, which is a continuation in part of co-pending U.S. patent application Ser. No. 12/286,779, entitled "METHOD FOR THE SECURE LOGGING OF CORRESPONDENCE AND NOTIFICATION THEREOF", filed on Oct. 2, 2008, which claims priority to U.S. Provisional Patent Application Ser. No. 60/997,303, filed Oct. 2, 2007, entitled "METHOD FOR THE SECURE LOGGING OF CORRESPONDENCE AND NOTIFICATION THEREOF"; the disclosures of which are hereby incorporated by reference as if fully set forth herein.

TECHNICAL FIELD

The field of the present invention relates to the general art of a system for notification and logging of correspondence, and more particularly, to a method for logging client contact and information in an unalterable electronic format and providing notification to others of said correspondence.

BACKGROUND

The field of art encompassing notification systems includes electronic as well as telephonic and other means of providing information to selected individuals. Further, multiple means of notification may be utilized and alternated between to fit a particular scenario, with varying triggers being relied upon to initiate the provision of information.

Because of the vast array of fields that utilize methods for logging and notification of receipt of client information and communications with any number of possible triggers and methods of providing notification, it is nearly impossible to find representative examples of applicable prior art specific to the present invention. A large class of methods is devoted to assisting sales professionals in creating or maintaining custom lists, while other methods are designed to track "call center" contacts, while still others allow users to input personal information for social networking purposes.

Regarding assisting sales professionals and creating or maintaining custom lists, United States Patent Application 2003/0187715 of Foss Jr., discloses a method of utilizing a computer to enter customer leads and alert the sales professional to make a follow up sales call on a predetermined date. Further, U.S. Pat. No. 6,941,305 of Magouirk et al., discloses a method of opening client "tickets" to track sales leads and input client specific information, then close the "ticket" and prohibit further input of information.

Examples of methods designed to track client contacts include United States Patent Application 2006/0248043 of Powers, wherein is disclosed a very linear method of tracking one client contact to a call center, from the inception of the call through successful completion of the contact. The method in Powers tracks contacts with a customer in an "issue specific manner" and may utilize categorizing client contacts and chronological storage of contacts such as voice recordings, e-mail, and scanned documents. Further, United States Patent Application 2002/0128891 of McSherry discloses a method of utilizing customer ID numbers by call center employees to tailor responses based upon past customer contacts.

U.S. Pat. No. 7,257,200 to Valeriano, et al. provides for an automated notification method wherein a triggering event is detected and a level of urgency is assigned to the triggering event. Based upon the level of urgency, notification may or may not be prompted, with multiple means of notification provided for, again based upon the assigned urgency level.

Additionally, U.S. Pat. No. 6,064,999 to Goldsmith discloses a system for providing notification to banking customers when information regarding a banking transaction is received or processed. Once so processed, the system generates an electronic message providing information regarding the transaction and delivers the message to the customer via the means designated by the customer.

Therefore, there is a need for a secure electronically recorded log that permits the attachment of textual, graphical, and photographical files thereto with unalterable date and time stamps utilized to memorialize said log entries, where persons in possession of a secure webpage link and password or "key" may make entries into said log. And, a system that further provides for utilization of multiple means of providing notification of a log entry to members of a pre-designated notification, wherein said list may be customized from entry to entry based upon the confidential nature of the information disclosed. The prior art is deficient in these areas, as well as in allowing secured access to both customer and employee to the system for input of events into a project chronology, and in assigning unalterable date and time stamps to entries for record keeping and reporting purposes. This method may be of particular benefit in fields where quick action is needed while at the same time there is a need for accurate record creation and retention of the steps taken to address the emergency situation. This method is specifically well-suited for record keeping and retention with regard to environmental emergencies such as the release of toxic materials or efforts to remediate leaking storage tanks, where an accurate record of all steps taken and the time of taking the action are critical for reporting and liability establishing purposes. In such instances, the persons inputting entries into the log may include the Project Manager of a company contracted to respond to the incident, members of the company or business whose property or assets may be impacted in such an incident, and governmental officials responsible for monitoring action taken to such an incident.

The above-described deficiencies are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

These and other objects are achieved by utilizing a method of creating an electronically stored log that is securely accessible via the internet and updated by a Project Manager or invited participant upon initiation or receipt of either a telephonic or electronic communication amongst members of a predetermined and amendable notification list. To each electronically stored log entry is associated thereto an unalterable date and timestamp. Further, said method allows for the attachment of textual, graphical, or photographic data to each electronically stored log entry, and a means of notifying members of a predetermined list that may be altered from time to time, that a log entry has been made.

Upon the posting of an entry to said electronically stored log by either a Project Manager or member of the notification list, an electronic notification of the log posting is automatically sent to all members of the notification list, while the Project Manager initiates telephonic notification to the primary client contact.

An advantage of the method of securely logging correspondence and providing electronic notification thereof disclosed in the present invention is that it may be internet-based to allow remote access to those seeking to review or input data into the log.

Another advantage of the method of securely logging correspondence and providing electronic notification thereof disclosed in the present invention is that it provides for the issuing of an encrypted key for secure access to said log.

Still another advantage of the method of securely logging correspondence and providing electronic notification thereof disclosed in the present invention is that it creates an unalterable chronology of events, input by either a Project Manager or persons provided the secure access, by utilizing unalterable date and time stamps affixed to each log entry.

Yet another advantage of the method of securely logging correspondence and providing electronic notification thereof disclosed in the present invention is that it allows the person making a log entry to attach textual, graphical, photographical, and other types of documents to the log entry.

Still another advantage of the method of securely logging correspondence and providing electronic notification thereof disclosed in the present invention is that it provides automatic electronic notification of a log entry to all identified for such notification.

An additional advantage of the method of securely logging correspondence and providing electronic notification thereof disclosed in the present invention is that it allows a person in the field to make a telephonic contact to a Project Manager who can then make an electronic entry into the log, thereby providing real time logging of events.

In a further embodiment a method executed on a processor for creating a secure electronically recorded log is disclosed. The method causes the processor or other devices to receive information regarding a spill incident, wherein the information includes an approximate location of the spill incident or a description of a material spilt, populate the secure electronically recorded log with a geolocation code associated with the spill incident, wherein the geolocation code is ascertained as a function of the approximate location of the spill incident, and communicate notifications to a Project Manager assigned to oversee remediation of the spill incident or a representative of a client that supplied the information regarding the spill incident.

In yet a further embodiment disclosure is made of a system for creating an electronic ticket in an emergency response remediation environment. The disclosed system includes a processor configure to: elicit information regarding a spill event from a client, the information includes an approximate location of the spill event or a description of a material spilt, automatically fill in a field of the electronic ticket with a geolocation code associated with the spill event, wherein the geolocation code is ascertained as a function of the approximate location of the spill event and generate and dispatch a notification to a Project Manager assigned to oversee remediation of the spill event or a representative of the client that supplied the information regarding the spill event.

In still a further embodiment a computer-readable medium having computer-executable instructions for performing a method is described. The method associates a geolocation code to an electronic ticket that includes a field identifying an approximate location of a spill event or a magnitude of a material spilled in the spill event, populates the electronic ticket, as a function of the geolocation code or the magnitude of the material spilled, with regulatory deadlines mandated by statute required to remediate the spill event, and transmits, periodically and/or continuously, a notification to a Project Manager assigned to oversee remediation of the spill event or a representative of a client that supplied information regarding the spill event.

Other objects, features, and advantages of the method of securely logging correspondence and providing electronic notification thereof disclosed in the present invention will become apparent from the following descriptions, taken in context with the accompanying drawings, wherein, by way of illustration, an embodiment of the present invention is disclosed.

The following description and the annexed drawings set forth in detail certain illustrative aspects of the disclosed subject matter. These aspects are indicative, however, of but a few of the various ways in which the principles of the subject application can be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to select appropriate relay stations for secondary transmitter and secondary receivers randomly situated within a cognitive radio network, wherein the secondary receiver and secondary transmitter can base their respective decisions as to which relay station is the most suitable relay station at least in part on links between the relay station and the secondary receiver and the secondary transmitter and the relay station.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Figure 1:
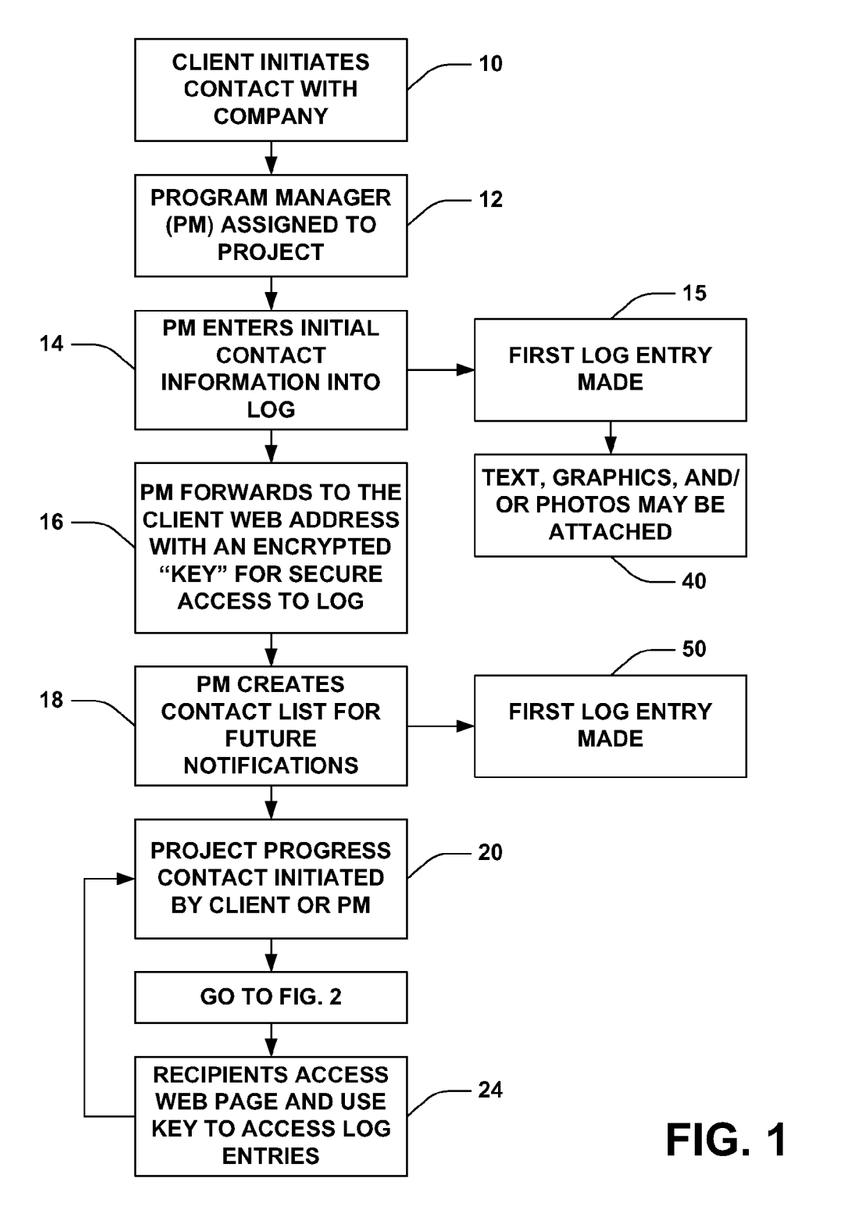
FIG. 1 is a flowchart detailing the acts involved in the method of the present invention.

FIG. 1 depicts a method of providing for a secure electronically recorded log that features the ability to append textual, graphical, and photographical files to said electronic log entry, and a means of utilizing multiple means of notifying members of a pre-designated list of such a log entry.

As is illustrated in FIG. 1, initial contact is made by a prospective client to a facilitator 10, in the preferred embodiment, said facilitator being an employee of a company providing emergency response in environmental contamination events, which commences a project. Following said initial contact 10, said facilitator assigns a Project Manager to coordinate said remediation project, 12, with said Project Manager taking said information gained from said first contact 10, setting up the log or "ticket" with said information 10, and making a first entry into an electronically stored log 15 that is accessible via the internet, to which textual, graphical, or photographic attachments may be appended thereto 40.

FIG. 1 further illustrates that, after said first entry is made into said electronically stored log 15, which essentially establishes log, said Project Manager then forwards a web address with an encrypted password or "key" to all future notice recipients identified by said client to access said electronically stored log 16. Following the entry of said first entry into said electronically stored log 15 said Project Manager compiles a notification list of all persons to receive notice of a communication once posted to said electronically stored log 18. Additional members may be added to or removed from said contact list as the project progresses 50.

As said project continues and subsequent communications are sent or received by said Project Manager, said communications are entered into said electronically stored log 20. The initial log entry 50, and each successive electronically stored log entry, is electronically and unalterably date and time stamped 24, and maintained in chronological order.

Figure 2:
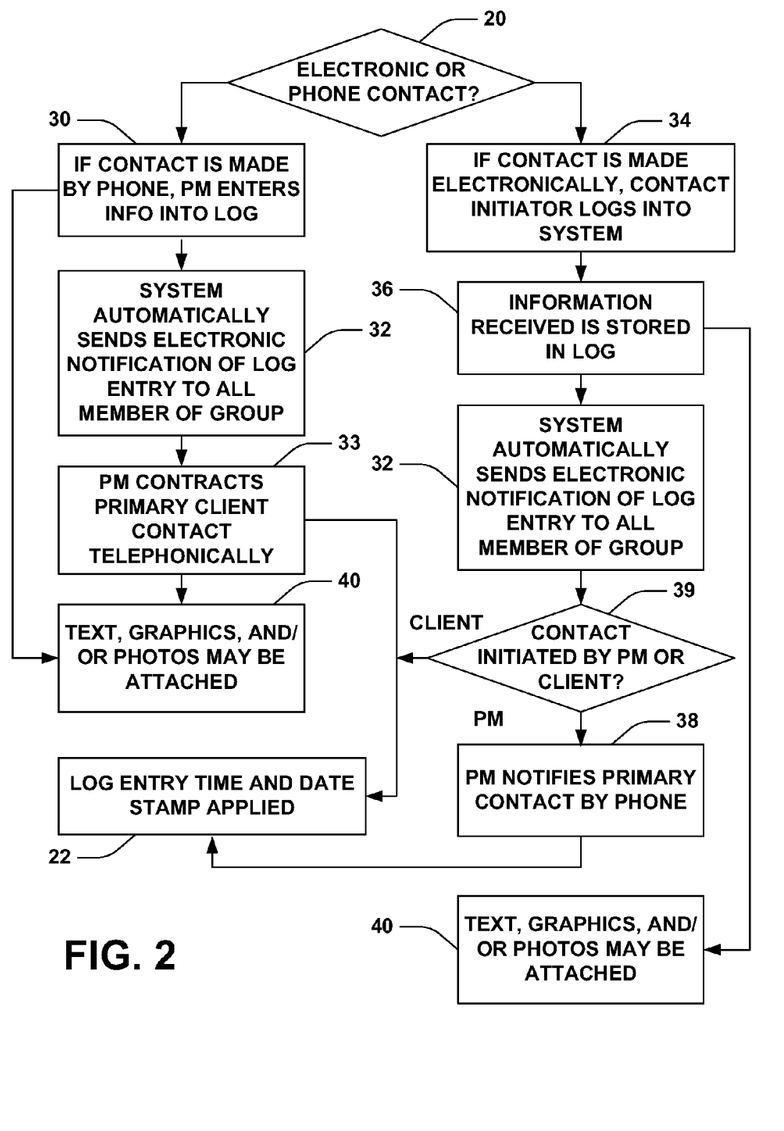
FIG. 2 is a flowchart of one segment of the acts involved in the method of the present invention.

FIG. 2 illustrates in greater detail the acts taken when a log entry is made by a participant or when said Project Manager receives a communication to be input into said log 20. Upon receipt of subsequent telephonic communications initiated by the Project Manager, client, or member of said to contact list, the Project Manager enters information regarding said telephonic communication into said electronically stored log 30. To said log entry 30, a textual, graphical, or photographic attachment may be appended thereto 40. Upon making said entry regarding telephonic communication 30, electronic notification of said log entry is automatically sent to all members of said contact list 32. Additionally, said Project Manager provides telephonic notification of such log entry to a predetermined client primary contact 33.

If, however, said subsequent communications is made electronically, as opposed to telephonically, the initiator of said electronic communication logs onto the system 34 utilizing said secure webpage and encrypted key said information is entered directly into and stored in said log 36 to which an unalterable electronic date and time stamp is affixed. To said log entry 30, a textual, graphical, or photographic attachment may be appended thereto 40. Upon making said log entry 36, electronic notification of said log entry is sent to all members of said contact list unit 32. If said entry 36 is initiated by said Project Manager, said Project Manager provides telephonic notification of said log entry 36 to said primary client contact 38. Telephonic contact is not typically initiated by said Project Manager when said electronic log entry 36 is initiated by either said client or said member of said the notification list 39.

Figure 3:
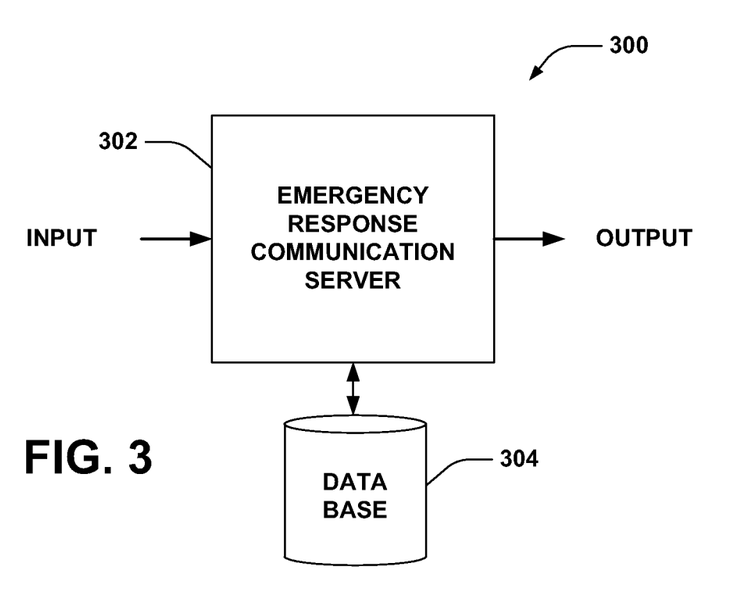
FIG. 3 illustrates a system that provides for a secure electronically recorded log that features the ability to append textual, graphical, and/or photographical files to an electronic log entry, and for utilizing one or more of a plurality of diverse communication devices to notify members of an established list of such a log entry.

Turning now to FIG. 3 that depicts a illustrative system 300 that provides for a secure electronically recorded log that features the ability to append textual, graphical, and/or photographical files to an electronic log entry, and for utilizing one or more of a plurality of diverse communication devices to notify members of an established list of such a log entry. As illustrated, system 300 can comprise an emergency response communication server 302 operably and/or communicatively coupled to a database 304. Emergency response communication server 302 can receive input from many disparate sources (e.g., Project Managers, clients, etc.) regarding a spill event or spill incident, wherein a client reports, electronically and/or telephonically, spillage of hazardous or non-hazardous materials. Examples, of such spillage events can include spills of petroleum products, chemicals, comestible and/or potable products, and the like. Typically, depending on the magnitude of the spill and whether or not the product is hazardous or non-hazardous, city, county, state, or federal requirements associated with cleanup or remediation of the event will need to be complied with. As those of ordinary skill in the art will appreciate, regulatory requirements and/or reporting requisites can differ amongst different levels of governments (e.g., city, county, state), can differ between states, and requirements imposed by states and those imposed by the federal government can also markedly differ.

Emergency response communication server 302 integrates all the information necessary for the reporting requirements as well as communications to and from the client. Emergency response communication server 302 takes every piece of the spill response information and places this information through a technical system that guides the process to a successful conclusion, ensuring that regulatory milestones are satisfied and regulatory mandated remediation actions are performed prior to regulatory deadlines. Emergency response communication server 302 communicates this information to all parties responsible (e.g., clients, call initiators, Project Managers, regulatory authorities, . . . ).

Typically, emergency response communication server 302 can dispatch notifications to the responsible parties in various device formats, appropriate for the devices utilized by the responsible parties. Typical devices that can be used by such parties can include cell phones, smart phones, personal digital assistants (PDAs), laptop computers, desktop computers, notebook computers, netbook computers, etc.

Once a call has been placed by a client call initiator reporting a spill incident or spill event, details, such as the location of the spill, the product spilt, and/or the estimated magnitude of the spill, are entered into emergency response communication server 302 and thereafter are persisted in database 304. Information associated with the location of the spill, the product spilt, the magnitude of the spill, etc. is utilized by emergency response communication server 302 to provide notification to the client regarding the type of cleanup necessary, the city, county, state, or federal regulatory requirements that need to be complied with, the name of the Project Manager assigned to oversee the cleanup, geographically proximate cleanup specialists qualified to provide services to remediate the spill, the estimated time that the cleanup specialists will arrive at the scene of the spill, etc. Other ancillary details can also be conveyed to clients and/or Project Managers tasked with overseeing remediation of a spill event through notifications periodically dispatched by emergency response communication server 302. Such other ancillary details can include information regarding status updates as to the progress of the remediation and satisfactorily accomplishing regulatory milestones and/or client mandated aspirational objectives with regard to remediation of the spill event.

Notifications dispatched by emergency response communication server 302 can additionally include periodic or continuous communication of details associated with regulatory reports that are being, or have been, completed on behalf of the client in regard to the spill event at issue. Thus for instance, where a particular federal or state agency, or set of agencies, needs to be informed and has been communicated with, documents (e.g., analytical and/or waste disposal documents), photographs, and videos associated with the incident at issue, can be conveyed to these agencies. Further, on-site communications and activities associated with the remediation endeavors associated with the incident can also be communicated to the client as well as other pertinent parties (e.g., regulatory agencies, remediation specialists, etc.). Generally, the on-site communication and updates associated with activities associated with remediation efforts can be manually entered by a Project Manager, wherein the Project Manager utilizes facilities affiliated with the emergency response communication server 302 to bring up the appropriate ticket or log entry associated with a particular spill event to fill in the required details into populatable fields (e.g., fields that are capable of being automatically and/or manually filled in) included within the log entry or ticket. Additionally and/or alternatively, the Project Manager can associate a text file, voice file, and/or audio/visual file with the ticket or log entry associated with the spill incident, wherein the text file, voice file, and/or audio visual file contains narrative commentary related to the remediation efforts being carried out by the Project Manager on behalf of the client. Such narrative commentary related to the remediation efforts can keep the client informed of every detail associated with the spill event. Accordingly, information from regulatory officials (e.g., environment protection officer, . . . ) and other relevant parties can be included in the narrative of the spill event as identified by the log entry or ticket. This information and/or documentation can be beneficial, especially to clients, for subrogation as well as legal purposes.

Database 304 can be utilized both as a storage means for persisting information input regarding the spill event, as well as, means for retrieving previously persisted information associated with city, county, state, and/or federal regulations regarding appropriate and mandated praxis necessary to remediate disparate spill events, client contacts and/or client operating contracts, remediation specialists (typically categorized by geographical location), and the like. As will be understood by those of ordinary skill in the art, database 304 can include any suitable data necessary for emergency response communication server 302 to facilitate and/or effectuate its aims. For instance, database 304 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with the network, contacts, questions answered, questions posted, response time for questions, a credit score, or any other information related to software, applications, and/or any suitable data related to transactions etc.

It is to be appreciated that database 304 can be, for example, volatile memory or non-volatile memory, or can be both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Database 304 of the subject systems and methods is intended to comprise, without being limited to, these and any other suitable types of memory. In addition it is to be appreciated that database 304 can be a server, a hard drive, and the like. Moreover, it should be noted that the data and/or services utilized by emergency response communication server 302 can be persisted and/or retrieved from a cloud computing environment.

Figure 4:
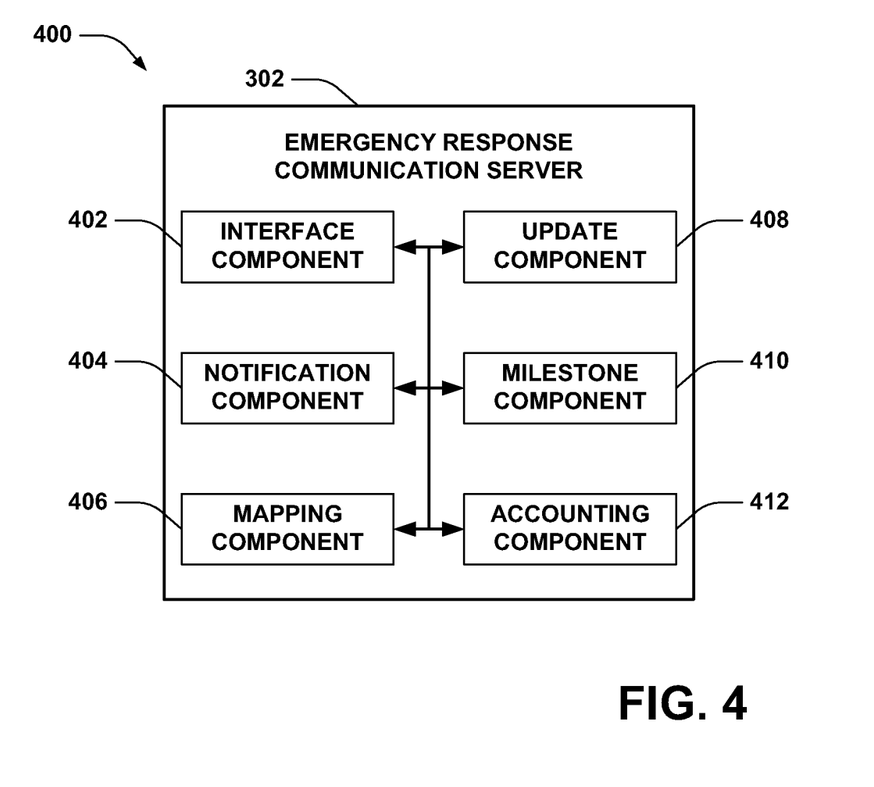
FIG. 4 provides illustration of emergency response communication server that provides for a secure electronically recorded log that features the ability to append textual, graphical, and/or photographical files to an electronic log entry, and for utilizing one or more of a plurality of diverse communication devices to notify members of an established list of such a log entry.

FIG. 4 provides further illustration of emergency response communication server 302. As depicted, emergency response communication server 302 can include interface component 402 that can be employed to gather information from a client (e.g., an individual reporting a spillage event) regarding a spill event or incident. Usually, information about a spill event or incident is received telephonically from the client, though other means of communicating information regarding a spill event, such as use of electronic mail, short message service (SMS), multimedia messaging service (MMS), and the like, can also be used with equal facility and/or to similar effect. Typical information that can be communicated by the client call initiator can include details such as the location of the spill, the estimated or actual quantity and type of material (hazardous, non-hazardous, petroleum based, etc.) spilt. This information is obtained/elicited, using a customized, or customizable, form generated and/or displayed by interface component 402.

The gathered information can be used to create a ticket or log entry that can include a description of factors surrounding the spill incident, status of the event (open/closed), identification of a Project Manager tasked with managing remediation of the incident to a successful conclusion, client contact information including all individuals within the client organization that need to be informed or will provide supplementary information associated with the spill incident, proximate remediation specialists qualified and/or capable of cleaning up the spilled material in conformance with federal and/or state mandated guidelines, a claim and/or project number supplied by the client that can be employed as a reference number, incident time and/or date, as well as the actual location of the spill event.

The actual location of the spill event can be determined using mapping component 406 that through facilities provided by global positioning satellite (GPS) technologies can assign a geo-location code that accurately identifies the location of the spill event. The geo-location code assigned can typically be a function of the approximate location supplied by the client on initial contact.

As will be appreciated by those of ordinary skill, a proportion of the information included in the newly saved/generated log entry or ticket can be retrieved from database 304, wherein previously persisted information can be stored. For example, information that can be retrieved from database 304 can include client contact information for pre-existing clients, details associated with the selected Project Manager, and/or remediation specialists within the proximity of the spill event. As will further be appreciated by persons of ordinary skill, other information included in the newly created ticket or log entry can be derived as a function of information supplied by the client during the initial contact regarding the spill event and/or information retrieved from database 304. For instance, the derivable information can include the actual location of the spill. As stated above, the actual location of the spill event can be ascertained based at least in part on the approximate location supplied by the client during the initial contact regarding the spill.

Once the log entry or ticket has been saved, created, and/or generated, the Project Manager assigned to manage the remediation of the spill event, through interface component 402, can periodically update the ticket as cleanup endeavors progress. For example, the Project Manager can, on an ongoing basis, associate or include executive summaries of pertinent details that have transpired during the remediation efforts. Additionally, using interface component 402, the Project Manager can associate or link files, documentation, images, videos, reports, transcripts, and the like, to the ticket or log entry. These associated files, images, videos, reports, etc. can be utilized for purposes of subrogation, for example, and can further be employed to track progress of the cleanup of the spill event, so that federal, state, or client mandated timelines can be adhered to.

A further feature of interface component 402 is that it, in conjunction with update component 408 and/or milestone component 410, for instance, can provide an overview of a Project Manager's impending deadlines associated with each spill event over which the Project Manager has control. Thus, interface component 402, can list for a single spill event impending regulatory milestones that are fast approaching and regulatory milestones that have unwittingly lapsed and that require remedial actions to be undertaken to remedy the lapse. Similarly, interface component 402 can list, for a multiplicity of spill events managed by a single Project Manager, the regulatory and/or client mandated due dates that have to be satisfied with each respective spill event. Thus, for instance in one view, interface component 402 can provide a view of particular incidents currently open (e.g., pending closure) and managed by a particular Project Manager for an individual client. Similarly, in another view interface component 402 can provide a view of all open incidents (e.g. awaiting appropriate cleanup) for a particular client, wherein the open incidents are managed by a particular Project Manager. Additionally, in a further view, interface component 402 can provide a view of all currently open incidents managed by a particular Project Manager on behalf of multiple clients.

The overview feature provided by interface component 402 can allow the Project Manager the ability to ensure that the appropriate regulatory documentation and procedural steps necessary to remediate a spill event are effectuated in a timely manner, thereby reducing the client's liability associated with missing regulatory milestones in remediating the spill event.

Moreover, interface component 402, through facilities provided by a webpage generated by interface component 402, can provide clients the ability to view and append messages, documents, voice files, images, videos, etc. in a manner similar to that performed by Project Managers. These appended documents, voice files, images, etc. can typically be pertinent to the spill event to which the log entry or ticket is associated. It should be noted that when either the Project Manager or client interacts, through the webpage supplied by interface component 402, with a particular log entry or ticket associated with a spill event, the date and/or time of the interaction is automatically recorded/noted and included in the ticket or log entry. The date and/or time is typically obtained from a clock associated with emergency response communication server 302. Additionally, it should be noted that the web interfaces generated and supplied by interface component 402 to clients and Project Managers can differ markedly. Web interfaces provided to Project Managers can allow them to perform the panoply of tasks required to conclude remediation of cleanup efforts, whereas web interfaces supplied for client interaction with emergency response communication server 302 can provide limited access to view status updates, upload documents associated with a particular spill incident, and the facility to generate reports associated with each client's spill events.

Interface component 402 can further provide an administrator aspect that can allow selected and designated administrators of emergency response communication server 302 to perform administrative tasks, such as creating and updating federal and state mandated cleanup guidelines, forms, deadlines, etc., that need to be satisfied for particular cleanup events.

Notification component 404 can be employed once the log entry or ticket containing relevant information has been created and/or saved after initial client contact has been made regarding a particular spill incident reported by a client. Notification component 404, as a function of the information included in the log entry or ticket, can dispatch notifications to the client, as well as other involved or interested parties regarding the creation of the log entry or ticket. Individuals to whom notifications can be dispatched or sent can include, for example, the Project Manager assigned to handle the spill event and/or the remediation specialists contracted to perform cleanup of the spill.

Generally, the notifications communicated to each of these individuals, via e-mail or short message service, for example, can include a hyperlink to the log entry or ticket, as well as, other ancillary information relevant to the spill event and/or the individual to whom the notification is addressed. For instance, a notification to the client can have a hyperlink to the ticket or log entry that allows the client to add relevant files, documentation, images, videos, voice files, etc. to the ticket or log entry, and permits the client to view the ongoing status of the ticket as remediation efforts progress to a successful conclusion.

It should be noted that the hyperlink provided to clients generally does not allow them to modify the ticket apart from allowing them to add pertinent documentation relevant to the spill event and the subsequent cleanup. Notifications provided by notification component 404 to Project Managers, in contrast, can also include a hyperlink to the ticket or log entry; however, this hyperlink can provide the Project Manager a more extensive array of views and/or facilities to modify the ticket or log entry. It should be noted in this context that time and date stamps can be generated by emergency response communication server 302 and associated with each and every particular ticket or log entry. Nonetheless, to preserve the integrity of the system, these time and date stamps are not modifiable by any individual. Other entries associated with the ticket or log entry can nevertheless be updated or selectively modified by the Project Manager and/or the administrator. For example, a hyperlink supplied to Project Managers can allow them to add or remove documents, images, voice files, etc. associated with a particular ticket or log entry controlled by them.

Additionally, the hyperlink provided to Project Managers can enable them to view regulatory requirement deadlines associated with a particular cleanup. For instance, federal or state guidelines may require that a non-hazardous chemical spill be cleaned up within 10 days and that form X be filed with regulatory authority A within 12 hours of the spill, form Y be completed and filed within 5 days of the spill and filed with regulatory authorities A and C, and form Z be filed on the earlier of, 3 days after completion of the remediation effort or on the 10th day subsequent to the spill, with regulatory authorities A, B, C, and D, wherein D also needs to be furnished, in addition to form Z, with notarized copies of forms X and Y.

Notification component 404, in addition, can also provide to the Project Manager a summary of all spill incidents for which he or she is responsible. This summary can highlight actions that need to be performed prior to specific deadlines. This summary can be sorted by client, wherein incidents for a single client can be grouped together. So in one view notification component 404 can provide a view of all incidents that are currently open (e.g., pending closure) and are being managed by a particular Project Manager for an individual client. In another view, notification component 404 can provide a view of specific open incidents (e.g., awaiting appropriate cleanup) for an individual client, wherein the open incidents are managed by a particular group of Project Managers. In yet a further view, notification component 404, can provide a view of all currently open incidents managed by a particular Project Manager on behalf of multiple clients.

Notification component 404 can further supply to the client a tabbed report detailing the actions that have been performed, or will be performed, to remediate a particular spill event. The tabbed report can include tabs or sections associated with federal reporting requirements, state reporting requirements, and relevant parties that have been contacted, and/or that need to be contacted, in regard to different stages in the remediation process. Additional details that can be included in the report can include, for example, remediation contractors utilized in the remediation efforts, and the like. It should be noted that since clients can have specialized reporting requirements in addition to those mandated by federal and state regulatory authorities the report supplied by notification component 404 to each client can be individuated and/or customized for each client based on there specialized client reporting requirements.

Reports supplied by notification component 404 to clients can also include fields associated with completion dates and notification dates (e.g. especially when an item becomes overdue). These fields can be populated automatically by the emergency response communication server 302 and are typically a function of regulatory mandates associated with particular material spill incidents. Thus, a spill of a hazardous material can have more stringent reporting deadlines than a spill involving non-hazardous materials. Similarly, a spill event involving a hazardous material can have many more reporting deadlines than a spill event involving non-hazardous materials.

Additionally, notification component 404 can provide notification to Project Managers of action items that have not been completed within regulatory mandated or client specified time frames. Notification to Project Managers regarding lapsed action items can automatically be generated and sent, and typically can be time and date stamped and dispatched to Project Managers, noting to them that a regulatory deadline has been missed and appropriate corrective actions associated with the lapsed deadline are necessary and need to be performed.

Mapping component 406, in conjunction with facilities provided by one or more global positioning satellite (GPS) and its related and/or associated functionalities, can provide a geolocation code that accurately identifies the exact location or actual location of the spill event. The geolocation code generated by mapping component 406 can be ascertained as a function of, or in response to, the input of the approximate location of the spill event gathered when the client initiated contact to report the spill event, wherein the approximate location supplied by the client during the initial contact, together with data supplied by global positioning satellite technologies, can be utilized to generate the geolocation code of the exact or actual location of the spill event. The geolocation code ascertained by mapping component 406 can thereafter be employed to position or place the spill event on a geographically representative map (e.g., map of North America). The geographic map can also position remediation specialists that are proximate to the spill event as indicated by the geolocation code.

Update component 408 can be employed by both clients and Project Managers to interact with newly created and/or currently open tickets or log entries. In the case of client interactions with newly created and/or currently open tickets or log entries (e.g. tickets that still await successful conclusion of remediation efforts) update component 408, in cooperation with interface component 402, can provide a selectively curtailed interface that allows clients to view the progress of remediation efforts referenced by the ticket or log entry and to selectively append documents pertinent to the remediation efforts associated with the log entry or ticket. Typical actions, aside from viewing selected parts of the ticket or log entry, that update component 408, in conjunction with interface component 402, can permit clients to perform on a log entry or ticket, can include appending relevant documentation, images etc. to the log entry or ticket. Generally, this documentation, images, voice files, etc. can have bearing on factors surrounding the spill event.

Additionally, update component 408, once again in cooperation with interface component 402, as well as other aspects of the emergency response communication server 302 (e.g., mapping component 406 and milestone component 410), can provide Project Managers with a more extensive, less curtailed, range of interactions with open tickets or log entries. For instance, update component 408, through a web interface supplied and/or displayed by interface component 402, can allow Project Managers to periodically enter executive summaries related to a particular spill event associated with a ticket item or log entry. These executive summaries can detail the progress of the remediation efforts associated with the particular log entry or ticket. It should be noted that such executive summaries, like all interactions with emergency response communication server 302, are date and time stamped utilizing a clock associated with the emergency response communication server 302. Further, update component 408 can permit Project Managers to update, modify, upload, and/or link or otherwise associate a plurality of relevant or pertinent files, documentation, images, video, reports, voice files, and the like, with the particular ticket item or log entry.

It should be noted in regard to the foregoing that in addition to time and date stamping, interactions conducted through update component 408, and the other facilities provided by emergency response communication server 302, each interaction can be associated and/or tracked by the internet protocol (IP) address obtained from the device from where the interaction occurred. Thus, when a Project Manager makes an entry regarding a spill event, the entry can typically be associated with a date and timestamp, as well as, the IP address of the device that the Project Manager utilized to make the entry. Similarly, when the client makes an entry to, or updates, an open ticket item, such a client entry will also be associated with a date and timestamp, as well as, the IP address of the device that the client employed to make the entry.

Milestone component 410 can be utilized to ensure that federal, state, and/or client specified deadlines are not missed. Since federal, state, and/or industrially agreed policies have timelines that require adherence, milestone component 410 can keep track and ensure conformance with these deadlines and milestone events, by providing timely notifications to Project Managers and/or clients regarding these events. Milestone component 410, in collaboration with notification component 404 for instance, can dispatch notifications to Project Managers indicating that compliance with one or more regulatory mandated or client required due date has been missed, and that appropriate corrective action is required. Typically, due dates are automatically populated into, propagated, or associated with, the ticket or log entry on its creation and are usually based on federal or state regulation, or client request regarding a particular spill incident.

Milestone component 410, in addition to dispatching notifications regarding lapsed due dates or regulatory deficiencies or omissions, can also be employed to prospectively propagate due dates into calendaring facilities employed by Project Managers to keep track of the multiplicity of deadlines that can be associated in remediating spill events. These due dates can typically be propagated into calendaring facilities employed by Project Managers when the ticket or log entry is created upon initial client contact regarding a particular spill event, and/or the particular spill event is assigned to a Project Manager for subsequent remediation.

Accounting component 412 can be utilized to generate periodic accounting reports that can be sent to the client regarding the entirety of activities undertaken to successfully remediate a spill event. Accounting component 412 can for instance, itemize the respective activities that went into the cleanup effort and assign the appropriate costs associated with the cleanup, and thereafter dispatch an invoice to the client via the facilities supplied by interface component 402 and/or notification component 404.

Figure 5:
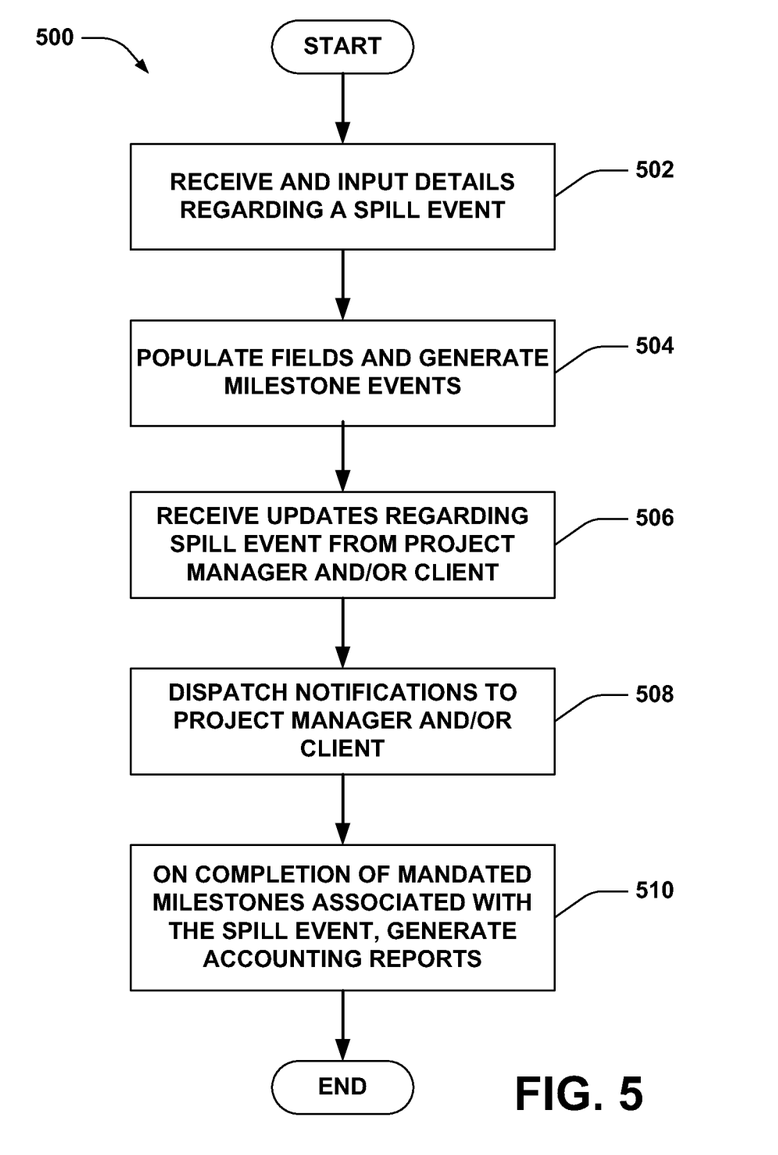
FIG. 5 illustrates a flowchart that outlines a process or method for providing a secure electronically recorded log or ticket that features the ability to append textual, graphical, and photographical files to the created electronic log entry or ticket, and notifying members of a pre-designated list of the existence of such a log entry.

FIG. 5 illustrates a methodology in accordance with the disclosed subject matter. For simplicity of explanation, the methodology is depicted and described as a series of acts. It is to be understood and appreciated that the subject application is not limited by the acts illustrated and/or by the order of acts. For example, acts can occur in various orders and/or concurrently, and with other acts not presented or described herein. Furthermore, not all illustrated acts may be required to implement the methodology in accordance with the disclosed subject matter. In addition, those skilled in the art will understand and appreciate that the methodology could alternatively be represented as a series of interrelated states via a state diagram or events. Additionally, it should be further appreciated that the methodology disclosed hereinafter and throughout this specification is capable of being stored on an article of manufacture to facilitate transporting and transferring such methodology to computers. The term article of manufacture, as used herein, is intended to encompass a computer program accessible from any computer-readable device, carrier, or media.

FIG. 5 provides a flowchart that outlines a process or method 500 for providing a secure electronically recorded log or ticket that features the ability to append textual, graphical, and photographical files to the created electronic log entry or ticket, and notifying members of a pre-designated list of the existence of such a log entry. Method 500 can commence at 502, whereupon the emergency response communication server 302 can be employed to receive input regarding a spill event. Typically, information regarding a spill event will be communicated by a client, telephonically and/or via short message service or multimedia messaging service, for example, and can include information regarding an approximate location of the spill event, and/or the type and magnitude of the material spilt (e.g., hazardous, non-hazardous, petroleum-based, . . . ).

At 504, based on, or as a function of, the information gathered at 502, a ticket or log entry can be generated, wherein information associated with the actual location of the spill event (e.g., identified by a geolocation code based on the approximate location of the spill incident), time deadlines (milestones) necessary to comply with regulatory requirements and/or client specified time limits, appropriate contact individuals, remediation specialists in the proximity of the spill identified, and the like, can automatically be retrieved from one or more databases and/or inferred, derived, and/or ascertained, and used to populate the fields included in the ticket or log entry.

At 506 updates regarding the spill event can be appended to the open ticket or log entry by either the client or the Project Manager overseeing remediation of the spill event. Updates to the spill event can include files, documentation, images, reports, voice recordings, audio and/or video files, etc. appended to the ticket or log entry by either a Project Manager and/or a client. Generally, updates to the ticket or log entry are time and date stamped using a clock maintained by emergency response communication server 302. As has been stated earlier, time and date stamps assigned by emergency response communication server 302 through an associated clock and affixed with the log entry or ticket are not modifiable. Additionally, updates to the ticket or log entry can be marked or associated with an IP address of the device from which an update to the ticket or log entry was made. Like the time and date stamp, IP addresses associated with updates to the log entry or ticket are indelible and cannot be modified once associated with the log entry or ticket.

At 508 notifications can be communicated to the Project Manager in charge of remediation of the spill event identified by the ticket or log entry. Identification of the spill event through the ticket or log entry can be effectuated by use of client generated reference number and/or by a unique tracking number generated by emergency response communication server 302 and associated with the log entry or ticket. Further, at 508 notifications regarding deficiencies or omissions in regulatory compliance can be also highlighted, or brought to the attention of, and directed to Project Managers charged with overseeing remediation of spill events on behalf of clients. In a similar manner, notification to clients (or selected individuals within the client organization) regarding the spill event, actions required of the client, and information regarding ongoing efforts to remediate the incident to ensure regulatory compliance, etc. can also be communicated to clients at 508. Further, at 508 tabbed reports and/or periodic summaries outlining the steps that have successfully (or unsuccessfully) been undertaken to remediate the spill can be generated and dispatched to the client. The tabbed reports and/or periodic summaries can outline progress in the remediation efforts associated with the log entry or ticket.

At 510, on completion of all, or certain, milestone events associated with remediation of a spill event, emergency response communication server 302 can generate and dispatch to the client an accounting report that outlines or itemizes the costs involved with the remediation efforts and steps undertaken to cleaning up the spilled material.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 622 (see below), disk storage 624 (see below), and memory storage 646 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 6:
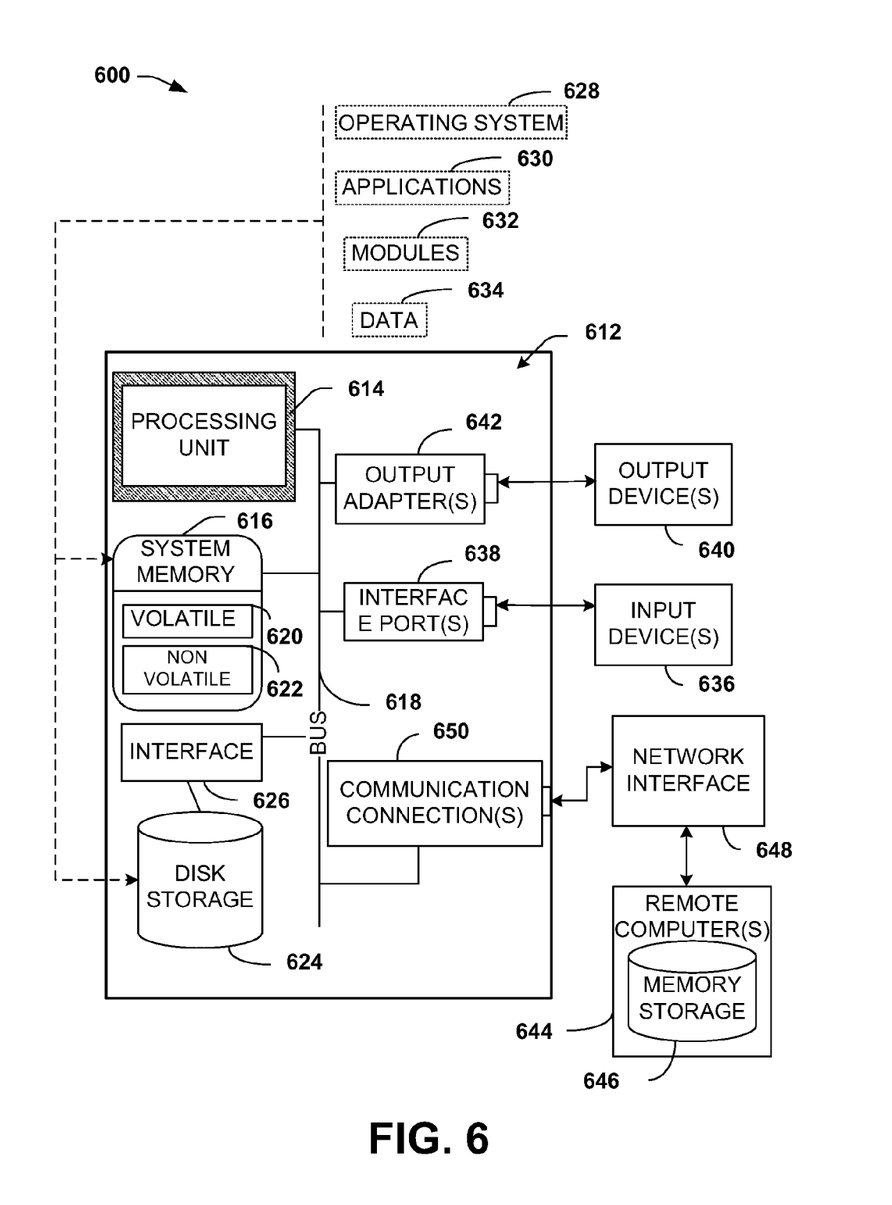
FIG. 6 illustrates a block diagram of a computing system operable to execute the disclosed systems and methods, in accordance with an embodiment.

In order to provide a context for the various aspects of the disclosed subject matter, FIG. 6, and the following discussion, are intended to provide a brief, general description of a suitable environment in which the various aspects of the disclosed subject matter can be implemented, e.g., various processes associated with FIGS. 1-5. While the subject matter has been described above in the general context of computer-executable instructions of a computer program that runs on a computer and/or computers, those skilled in the art will recognize that the subject application also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 6, a block diagram of a computing system 600 operable to execute the disclosed systems and methods is illustrated, in accordance with an embodiment. Computer 612 includes a processing unit 614, a system memory 616, and a system bus 618. System bus 618 couples system components including, but not limited to, system memory 616 to processing unit 614. Processing unit 614 can be any of various available processors. Dual microprocessors and other multiprocessor architectures also can be employed as processing unit 614.

System bus 618 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 616 includes volatile memory 620 and nonvolatile memory 622. A basic input/output system (BIOS), containing routines to transfer information between elements within computer 612, such as during start-up, can be stored in nonvolatile memory 622. By way of illustration, and not limitation, nonvolatile memory 622 can include ROM, PROM, EPROM, EEPROM, or flash memory. Volatile memory 620 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 612 can also include removable/non-removable, volatile/non-volatile computer storage media, networked attached storage (NAS), e.g., SAN storage, etc. FIG. 6 illustrates, for example, disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to system bus 618, a removable or non-removable interface is typically used, such as interface 626.

It is to be appreciated that FIG. 6 describes software that acts as an intermediary between users and computer resources described in suitable operating environment 600. Such software includes an operating system 628. Operating system 628, which can be stored on disk storage 624, acts to control and allocate resources of computer 612. System applications 630 take advantage of the management of resources by operating system 628 through program modules 632 and program data 634 stored either in system memory 616 or on disk storage 624. It is to be appreciated that the disclosed subject matter can be implemented with various operating systems or combinations of operating systems.

A user can enter commands or information into computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 614 through system bus 618 via interface port(s) 638. Interface port(s) 638 include, for example, a serial port, a parallel port, a game port, and a universal serial bus (USB). Output device(s) 640 use some of the same type of ports as input device(s) 636.

Thus, for example, a USB port can be used to provide input to computer 612 and to output information from computer 612 to an output device 640. Output adapter 642 is provided to illustrate that there are some output devices 640 like monitors, speakers, and printers, among other output devices 640, which use special adapters. Output adapters 642 include, by way of illustration and not limitation, video and sound cards that provide means of connection between output device 640 and system bus 618. It should be noted that other devices and/or systems of devices provide both input and output capabilities such as remote computer(s) 644.

Computer 612 can operate in a networked environment using logical connections to one or more remote computers, such as remote computer(s) 644. Remote computer(s) 644 can be a personal computer, a server, a router, a network PC, a workstation, a microprocessor based appliance, a peer device, or other common network node and the like, and typically includes many or all of the elements described relative to computer 612.

For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refer(s) to hardware/software employed to connect network interface 648 to bus 618. While communication connection 650 is shown for illustrative clarity inside computer 612, it can also be external to computer 612. The hardware/software for connection to network interface 648 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method for creating a secure electronically recorded log, comprising:

receiving information regarding a spill incident, wherein the information includes an approximate location of the spill incident or a description of a material spilt;

populating the secure electronically recorded log with a geolocation code associated with the spill incident, wherein the geolocation code is ascertained as a function of the approximate location of the spill incident and data supplied from a global positioning satellite and wherein the geolocation code identifies an exact location of the spill incident; and communicating a first notification to a Project Manager assigned to oversee remediation of the spill incident or a second notification to a representative of a client that supplied the information regarding the spill incident, wherein the first notification is formatted as a function of a communication device utilized by the Project Manager to receive the first notification, lists for the spill incident an impending regulatory milestone and a lapsed client mandated milestone that requires a remedial action, and includes a first link that permits the Project Manager to modify, add, and remove documents from the secure electronically recorded log, and the second notification includes a second link that permits the representative of the client to add and view documents included in the secure electronically recorded log in response to a modification of the documents by the Project Manager, and wherein the communicating is performed on at least one processor.

2. The method of claim 1, further comprising generating a report for a client as a function of data collected by the Project Manager assigned to oversee remediation of the spill incident and a client specific requirement, wherein the report is an individuated tabbed report that details actions performed by the Project Manager in remediating the spill incident.

3. The method of claim 1, wherein the first notification to the Project Manager, as a function of the geolocation code, includes one or more federally mandated due dates associated with remediation of the spill event.

4. The method of claim 1, further comprising creating a report as a function of the geolocation code associated with the spill incident, a cost associated with remediation of the spill incident, or a geographically proximate remediation specialist qualified to cleanup the material spilt in conformance with a regulatory guideline.

5. The method of claim 1, further comprising creating a report as a function of a quantity of the material spilt or a cause for a spillage of the material spilt.

6. The method of claim 1, further comprising creating a report based on a federal, a state, or a local regulatory notification associated with remediation of the material spilt, wherein the federal, the state, or the local regulatory notification includes a report number or identification of an individual affiliated with a federal, a state, or a local regulatory agency.

7. The method of claim 1, further comprising generating a report as a function of whether payment by the client for remediation of the spill incident is past due, has been paid, or is being processed.

8. The method of claim 1, further comprising generating a report based on waste disposal classifications associated with remediation of the material spilt or a cost associated with remediating the spill incident.

9. The method of claim 1, the populating further comprising retrieving from a database a form that needs completion prior to a mandated deadline, wherein retrieval of the form is based on the geolocation code and the material spilt.

10. The method of claim 9, the mandated deadline imposed by a federal or a state administrative body charged with overseeing cleanup of the material spilt.

11. The method of claim 10, wherein identification of the federal or the state administrative body is a function of the geolocation code.

12. The method of claim 9, wherein the mandated deadline is automatically populated to a calendar utilized by the Project Manager.

13. The method of claim 9, wherein when the mandated deadline has elapsed through an omission by the Project Manager, a third notification regarding the mandated deadline and the omission is communicated to the Project Manager.

14. A system for creating an electronic ticket in an emergency response remediation environment, comprising:
a processor configured to:
elicit information regarding a spill event from a client, the information includes an approximate location of the spill event or a description of a material spilt;
automatically fill in a field of the electronic ticket with a geolocation code associated with the spill event, wherein the geolocation code is ascertained as a function of the approximate location of the spill event and data retrieved from a global positioning satellite and wherein the geolocation code identifies an actual location of the spill event on a geographically representative map; and
generate and dispatch a first notification to a Project Manager assigned to oversee remediation of the spill event or a second notification to a representative of the client that supplied the information regarding the spill event, the first notification formatted in accordance with a format associated with a device utilized by the Project Manager to receive the first notification, wherein the first notification includes a first hyperlink to the electronic ticket that permits the Project Manager to modify content associated with the electronic ticket and lists regulatory and client mandated due dates associated with a multiplicity of spill events that includes the spill event from the client that have to be satisfied with respect to each spill event, and wherein the second notification includes a second hyperlink that permits the representative of the client to view the electronic ticket and add documents to the electronic ticket in response to a modification of the content associated with the electronic ticket.

15. The system of claim 14, the processor further configured to generate a customized report for the client, wherein the customized report is individuated as a function of data collected by the Project Manager assigned to oversee remediation of the spill event and a client specific requirement.

16. The system of claim 14, wherein the first notification to the Project Manager, as a function of the geolocation code, includes a location of a proximate remediation specialist capable of mitigating the spill event, federal, state, and county regulatory deadlines for remediation of the spill event, and client specific remediation requirements associated with the material spilt.

17. The system of claim 16, the processor further configured to dispatch further periodic notifications to the Project Manager when the federal, state, or county regulatory deadline associated with remediation or the spill event has elapsed or the client remediation requirements associated with the material spilt have not been satisfied.

18. The system of claim 14, wherein the representative of the client that supplied the information regarding the spill event is associated with a notification list.

19. A non-transitory computer-readable medium having computer-executable instructions for performing a method comprising:
associating a geolocation code to an electronic ticket that includes a field identifying an approximate location of a spill event or a magnitude of a material spilled in the spill event, wherein the geolocation code is determined as a function of the approximate location of the spill event and data obtained from a global positioning satellite and wherein the geolocation code identifies a specific location of the spill event;
as a function of the geolocation code or the magnitude of the material spilled, populating the electronic ticket with regulatory deadlines mandated by statute required to remediate the spill event; and
transmitting a first device formatted notification to a Project Manager assigned to oversee remediation of the spill event or a second device formatted notification to a representative of a client that supplied information regarding the spill event, wherein the first device formatted notification is based on a device format that is currently being employed by the Project Manager to receive device formatted notifications and includes a listing of impending regulatory milestones for the spill event, a listing of unwittingly lapsed client mandated deadlines for the spill event that that require remediation, and a hyperlink to the electronic ticket that allows for addition, removal, and modification of the regulatory milestones, and the second device formatted notification includes a hyperlink to the electronic ticket that permits the representative of the client to view an updated list of client mandated deadlines or an updated list of regulatory milestones in response to remediation of an unwittingly lapsed client mandated deadline or fulfillment of an impending regulatory milestone by the Project Manager.

20. The non-transitory computer-readable medium of claim 19, the method further comprising:
generating reports for a client as a function of data collected by the Project Manager assigned to oversee remediation of the spill event and a client specific requirement.

* * * * *